United States Patent [19]

Vislosky

[11] Patent Number: 4,570,047
[45] Date of Patent: Feb. 11, 1986

[54] SUBMERGED AUTOMATIC ARC WELDER

[76] Inventor: John Vislosky, 2902 Alpine St., Dallas, Tex. 75223

[21] Appl. No.: 651,619

[22] Filed: Sep. 17, 1984

Related U.S. Application Data

[63] Continuation-in-part of Ser. No. 437,502, Oct. 28, 1982, abandoned.

[51] Int. Cl.⁴ ............................................. B23K 9/04
[52] U.S. Cl. .................................. 219/73; 219/73.21; 219/76.14
[58] Field of Search .................. 219/73, 73.2, 73.21, 219/76.1, 76.14

[56] References Cited

U.S. PATENT DOCUMENTS

| | | | |
|---|---|---|---|
| 3,024,349 | 3/1962 | Hinrichsen et al. | 219/73.21 X |
| 3,305,663 | 2/1967 | Janssen | 219/73.2 X |
| 3,626,138 | 12/1971 | Hurley | 219/73 R |
| 4,221,957 | 9/1980 | Barger et al. | 219/73.2 |
| 4,271,346 | 6/1982 | Hardy | 219/76.14 |
| 4,404,450 | 9/1983 | Weldon | 219/73.21 X |

Primary Examiner—C. L. Albritton
Assistant Examiner—Catherine M. Sigda
Attorney, Agent, or Firm—Peter J. Murphy

[57] ABSTRACT

A welding machine includes a main housing with head stock and tail stock sections at its opposite ends having respective chucks for supporting a rotating work piece. A carriage movable endwise between the head stock and tail stock sections includes a head overlying the work area and a flux collection tray and associated circulation components underlying the carriage head and the work area. A welding torch assembly is supported in suspended adjustable relation from the carriage head and includes a welding tip through which weld wire is fed and a dispensing nozzle surrounding and concentric with the welding tip for dispensing granulated flux. Granulated flux is supplied by gravity from a hopper in the carriage head; and the flux is circulated from the hopper box under the collection tray to the overhead flux hopper by a pneumatic circulating system.'

3 Claims, 3 Drawing Figures

SUBMERGED AUTOMATIC ARC WELDER

BACKGROUND AND SUMMARY OF THE INVENTION

This application is a continuation-in-part of application Ser. No. 437,502, filed Oct. 28, 1982 entitled SUBMERGED AUTOMATIC ARC WELDER, abandoned.

This invention relates to automatic arc welding devices, and more particularly to submerged automatic arc welding apparatus with an improved flux circulating system.

An object of this invention is to provide a submerged automatic arc welder which is unique in design, and which may be employed for welding imported and domestic crank shafts of automotive vehicles, and other shafts, tubes and rods that are from one and one-half to five inches in diameter.

Another object of this invention is to provide an improved submerged automatic arc welder having a flux circulation system which enables the gravity flow of flux from a top hopper to cover the torch tip as it welds, and enable the recirculation of the flux to the top hopper.

A further object of this invention is to provide an improved submerged automatic arc welder so designed that powdered flux will gently pile up around and completely cover the weld wire emerging from the weld wire tip.

Still another object of this invention is to provide an improved submerged automatic arc welder which will not require a welding hood when in use.

A still further object of this invention is to provide an improved submerged automatic arc welder which is simple in design, inexpensive to manufacture, rugged in construction, easy to use, and efficient in operation.

These objects are accomplished in automatic arc welding apparatus which includes a main housing, and head stock and tail stock sections which are associated with the main housing at opposite ends for supporting a work piece. A carriage which includes an elevated head is mounted for endwise movement on the main housing; and a welding torch assembly and associated flux dispensing system are mounted on the carriage for movement therewith relative to a workpiece supported on the housing. The welding torch assembly includes a weld wire dispensing tip, weld wire conduit means for conveying weld wire to the dispensing tip, and flux dispensing conduit means including a dispensing nozzle enclosing the weld wire tip.

The novel features and the advantages of the invention, as well as additional objects thereof, will be understood more fully from the following description when read in connection with the accompanying drawings.

DRAWINGS

DESCRIPTION OF THE PREFERRED EMBODIMENT

Figure 1:
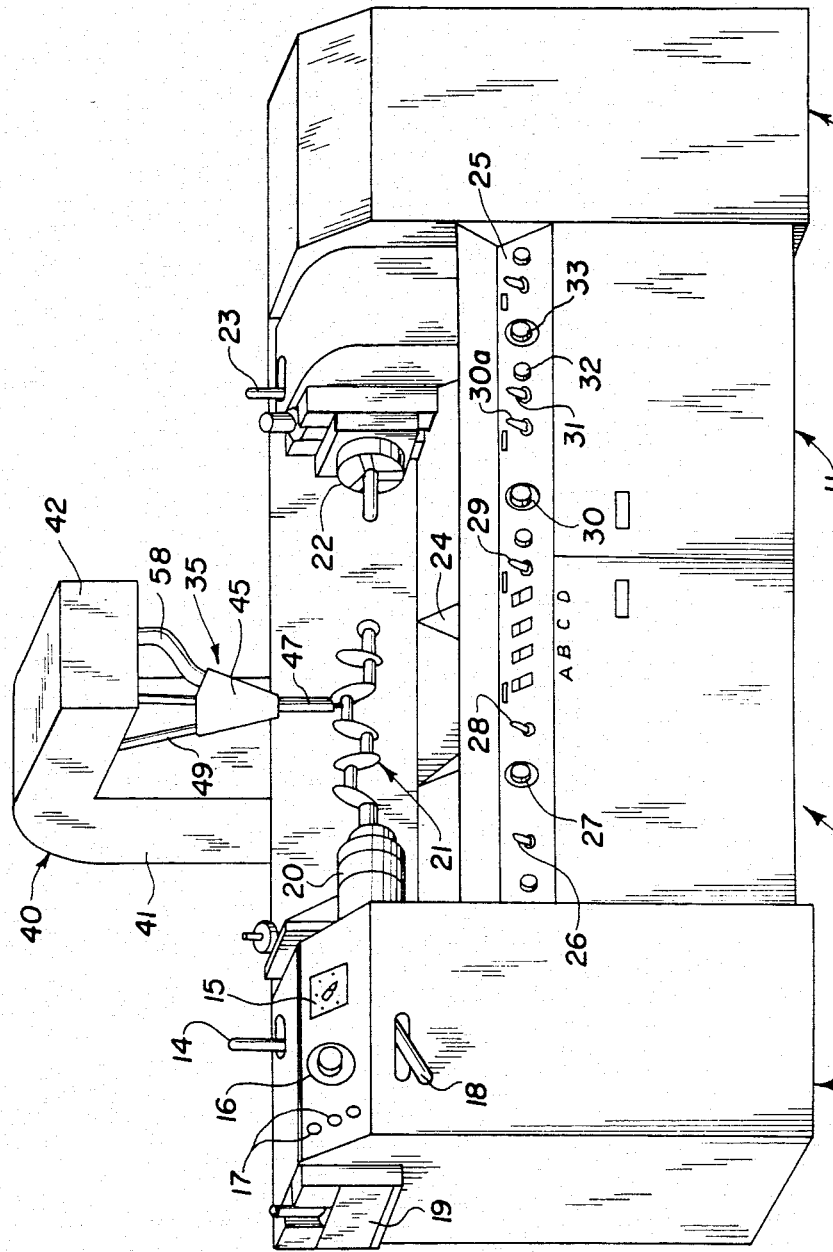
FIG. 1 is a perspective view of welding apparatus according to the invention.
Figure 2:
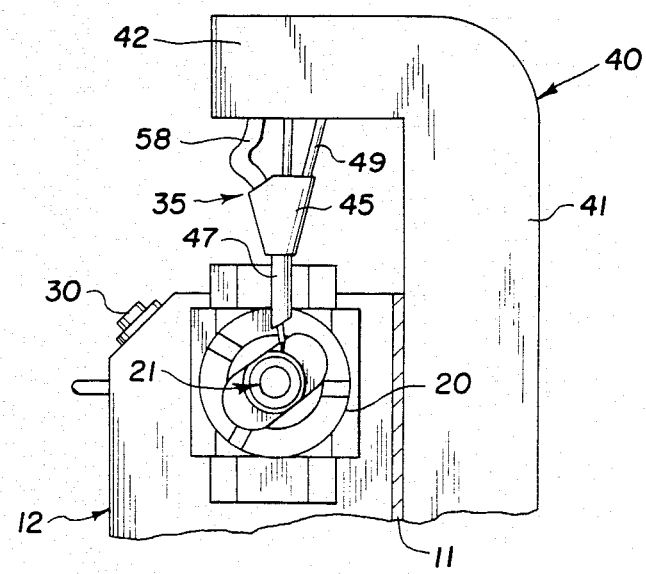
FIG. 2 is a fragmentary side elevation view, partially in section, of the apparatus of FIG. 1.

As best seen in FIG. 1, an overall welding machine 10 according to the invention consists of a main frame or housing 11 which includes a head stock section 12 at one end and a tail stock section 13 at the other end. The head stock section and tail stock section mount rotating chucks, 20 and 22 respectively, which define a rotating support axis for mounting a work piece such as a crank shaft 21. A carriage 40 is mounted for movement on the main housing 11 between the head stock and tail stock sections, that movement being parallel to the axis of rotation defined by the chucks 20 and 22. The carriage includes a vertical housing portion 41 and a transverse head 42 which extends over the main housing overlying the area where a work piece is supported.

A welding torch assembly 35 is suspended from the carriage head 42 above the work piece area; and supports the torch assembly in a manner to be adjustably positioned relative to a work piece as will be described. The welding apparatus of the invention utilizes a continuous weld wire, which may have a diameter of 0.035 inches for example, which weld wire is supplied to the torch assembly 35 by means not shown. The weld wire supply means may include the following components located, for example, within the tail stock section 13. Those weld wire feed components may include a mounting for a wire spool, a flexible conduit for conveying the wire from the housing 13 to the torch assembly 35, adjustable wire feed means including feed rollers driven by a variable speed electric motor, and means for coupling the wire to a welding voltage power supply to provide the welding current through the weld wire. Of course, the machine would provide means for also connecting the work piece to the power supply.

Figure 3:
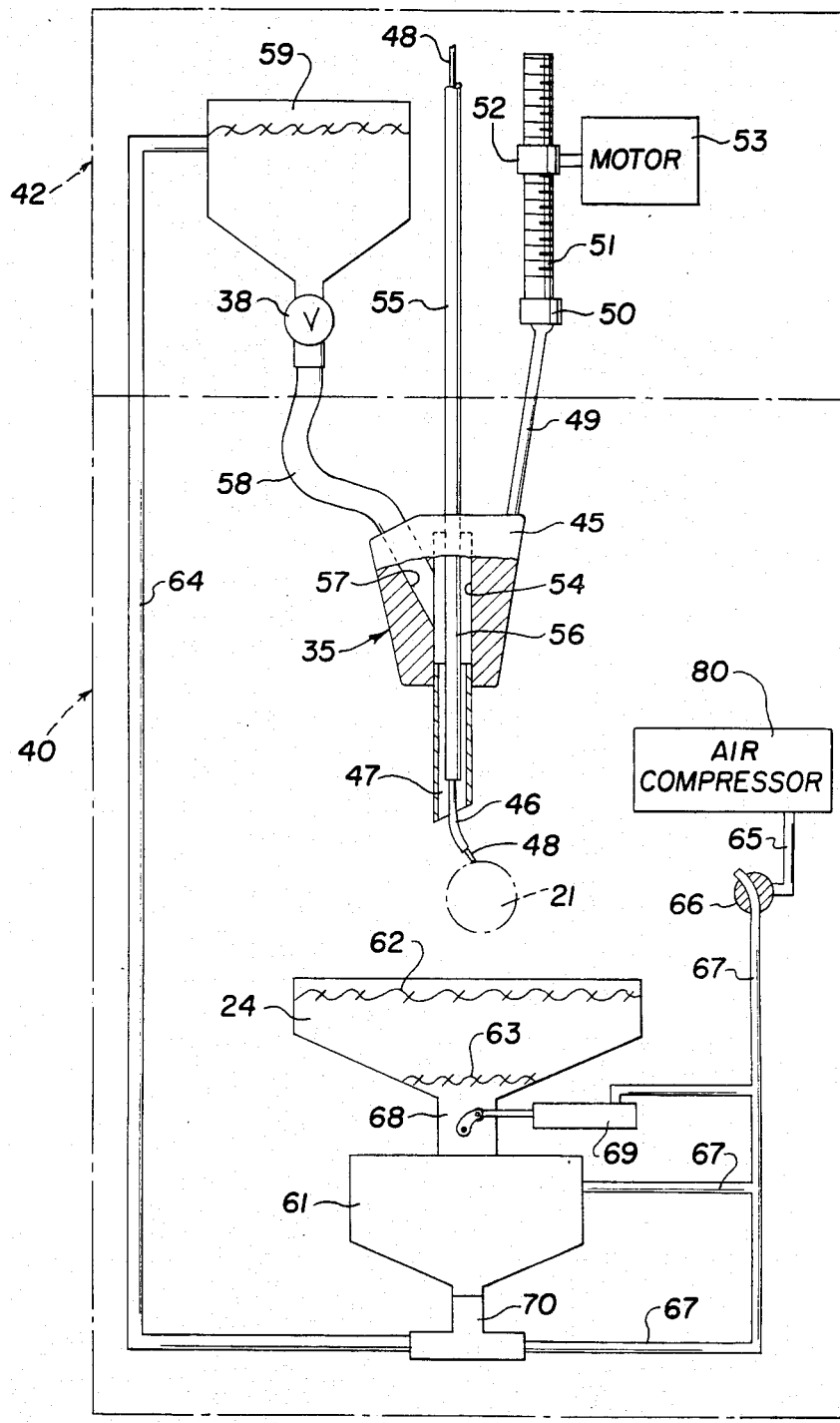
FIG. 3 is a diagrammatic illustration of the welding torch assembly and flux circulating system of the apparatus of FIG. 1.

The torch assembly 35, shown in all of the figures, is illustrated in some detail in the diagrammatic illustration of FIG. 3. This assembly includes a body 45 on which is mounted a downwardly extending torch tip consisting of a welding tip 46 and a flux nozzle 47 which surrounds the welding tip. As will be described in detail subsequently, the flux nozzle dispenses a flow of granulated flux to the area of the weld during welding, to gently flow and pile up around the weld wire which emerges from the welding tip so as to completely submerge the welding arc or flame. As will be seen in FIG. 3, the welding tip projects somewhat from the end of the flux nozzle; and a short length of weld wire 48 projects from the welding tip. The body 45 is suspended from the carriage head 42 by means of a support rod 49 ($\frac{3}{8}$ inch in diameter for example) which is rigidly anchored to the body 45. The upper end of the support rod 49 may be formed into a partially spherical ball for coupling in a swivel joint 50 to enable the selective positioning of the body 45 relative to the carriage head. The swivel joint 50 is mounted at the lower end of a linear rack 51 which is supported for vertical rectilinear movement within the carriage head; and is moved up and down by means of a pinion 52 driven by an electric motor 53 mounted in the carriage head. By means of this mounting, the body 45 may positioned at any desired elevational position relative to the work piece and may be swung and/or turned to any desired position by means of the swivel joint 50.

Referring now to other details of the body 45, the body has a large central passage 54, within which is mounted the upper end of the flux nozzle 47, and which terminates in a smaller passage at its upper end for the mounting of the weld wire conduit 55. This weld wire conduit which originates in the tail stock section as described above, passes through the carriage head 42 and then downward for connection to the welding torch body 45. A copper tube 56 defines a continuation of the weld wire conduit extending through the body 45 and projecting therefrom into the flux nozzle 47. The welding tip 46, which is also a tubular copper member, is desirably threaded into the lower end of the copper tube 57, since the welding tip is a replaceable component. The body 45 also includes a flux passage 57 which extends from the top of the body in angled and intersecting relation with the central passage 54. A flexible flux supply conduit 58 is mounted in the passage 57; and this supplies the granulated flux which flows through the passage 57 and then the passage 54 to flow from the flux nozzle which is generally concentric with the copper tube 56 and the welding tip 46. The granulated flux is supplied to the flux conduit 58 from a flux hopper 59 which is mounted in the carriage head 42; and the flux flows by gravity from this hopper into the flux supply conduit 58 under control of the flux valve 38 mounted at the discharge outlet of the flux hopper.

The system for circulating the granulated flux is illustrated in FIG. 3. A flux receiving tray 24 and an associated underlying flux box 61 are mounted on the carriage 40 and supported below the head 42 and below the area of the work piece so that the flux which flows over the work piece from the flux nozzle will fall into the flux receiving tray 24. This flux receiving tray is also illustrated in FIG. 1; and it will be seen that this tray will move laterally with the carriage relative to the work piece 21. During welding operations, the flux and any other material will flow from the work piece into the flux tray and directly into the flux box since the passage between the flux tray and flux box is normally open. In order to prevent any contaminants from mixing with the flux, the flux tray is provided with a first coarser filter screen 62 adjacent to the top of the tray and a second finer filter screen 63 near the bottom discharge of the flux tray. It is desirable that the flux which is returned to the flux hopper 59 be as uncontaminated as possible. The return of the flux from the flux box 61 to the hopper 59 is effected through a flux return conduit 64 by means of air flow through this conduit. Air, at 30 psi for example, is supplied to the system from a suitable compressor 80 possibly mounted within the machine housing 11. This pressurized air is supplied to several components as will be described through suitable air conduits 65 and 67 and a three-way control valve 66. A flux flow control valve 68 is mounted in the discharge of the flux tray 24 to selectively interrupt the flow of flux from the flux tray to the flux box 61; and this valve is controlled by a single acting air cylinder 69 for example. The discharge from the flux box 61 is through an inverted T coupling 70 to which the flux return conduit 64 is connected; and this is also connected to the air conduit 67. The air conduit 67 also supplies air to the interior of the flux box 61. At desired intervals, the air control valve 66 is opened to allow the flow of air to the air cylinder 69 which closes the valve 68 allowing the build up of air pressure within the flux box 61 and providing air flow to the T coupling 70 which effects the flow of flux from the T coupling through the flux conduit 64 to the hopper 59. The pressurization of the flux box encourages the flow of flux downward into the T coupling 70.

The valve 66 which is normally open may be a solenoid actuated valve which is controlled by a manual switch or may also be controlled automatically. In the closed condition of the valve 66 it will be vented to allow the valve 68 to open and to vent the flux box 61. In order to assure a continuous circulation of flux from the flux box 61 to the hopper 59, a suitable operating switch, such as a microswitch may be operated by the rotation of the head stock chuck 20 for example so that this switch is tripped intermittently with each rotation of the chuck.

FIG. 1 of the drawing illustrates a number of controls for the various functions of the apparatus which have been described. A counterweight 19 is provided for association with the drive of the chuck 20 for balancing the load which is supported between the chucks 20 and 22. A chuck lock lever 14 is provided for the chuck 20; and a clutch switch 18 is provided for engaging the rotation drive of the chuck 20. A rotation speed control switch 16 provides for selection of the speed of rotation of the chuck 20 and associated work piece. Voltage selector switch 15 allows selection of the welding voltage; and various fuses 17 are mounted in this section. The tail stock section includes a chuck lock lever 23 for the chuck 22.

The main housing 11 includes a front panel 25 for the mounting of several controls. Power or line switch 28 controls the supplying of electric power to the overall machine. Flux switch 26 controls the flux valve 38 at the discharge of the flux hopper 59 to control the flow of flux to the welding torch. Controls 29, 30 and 30a are for controlling the travel of the carriage 40. Selector switch 29 selects right or left feed of the carriage. Control 30 is a rheostat type control for selecting the speed of carriage movement; and switch button 30a is a jog switch to move the carriage incrementally when positioning the welding tip for the start of a welding operation.

Controls 31, 32 and 33 are for controlling movement of the tail stock chuck 22. Selector switch 31 selects forward or reverse movement. Rheostat type switch 33 controls the speed of tail stock feed; and jog switch 32 controls incremental travel for moving the tail stock into engagement with the work piece. Rheostat type switch 27 is for controlling the rate of feed of the weld wire from the welding tip.

Switches A, B, C and D are for activating certain functions during the welding operation. Switch A switches on and off the welding current. Switch B switches on and off the weld wire feeder. Switch C starts and stops the rotation of the chuck 20 and associated work piece. Switch D engages a carriage step mechanism which couples the carriage travel to the revolution of the chuck 20. This, of course, effects the movement of the carriage a desired increment for each revolution of the work piece.

What has been described is an improved submerged automatic arc welder having a number of features and advantages. One important feature of the apparatus is the provision of a flux discharge nozzle which encloses and is generally concentric with the welding tip to enable the smooth flow of flux to completely surround and submerge the weld area and the welding arc. This provides adequate flux for the weld and also eliminates the need for a welding hood.

Another particular feature and advantage of the apparatus is the mounting of the welding torch assembly in a universal manner with a power mechanism for raising and lowering the torch relative to the work piece, and with a universal coupling for positioning the torch laterally or rotationally in desired relation with the work piece.

A further important feature of the invention is the flux circulating system which collects the flux falling from the work piece and provides for the automatic recirculation of that flux to the supply hopper for reuse. This flux recirculation may be accomplished manually if desired.

While the preferred embodiment of the invention has been illustrated and described, it will be understood by those skilled in the art that changes and modifications may be resorted to without departing from the spirit and scope of the invention.

What is claimed is:

1. In an automatic arc welding apparatus including a main housing, head stock and tail stock sections associated with said housing at opposite ends thereof for supporting a work piece, a carriage including an elevated head mounted for endwise movement on said housing, and a welding torch assembly and associated fluxing system mounted on said carriage for movement therewith relative to a work piece supported on said housing, the improvement comprising said welding torch assembly including a welding tip, weld wire conduit means for supplying weld wire to said tip, and flux dispensing conduit means including a dispensing nozzle enclosing said welding tip;

adjustable support means in said carriage head for supporting said torch assembly body comprising:

a linear elongated rack mounted for vertical reciprocating movement in said carriage head; a pinion coacting with said rack and a reversible drive motor mounted in said carriage for reversibly driving said pinion; a swivel coupling mounted at the lower end of said rack; and said torch assembly support rod being supported by said swivel coupling to enable the positioning of said torch assembly body in desired relation to a work piece.

2. In an automatic arc welding apparatus including a main housing, head stock and tail stock sections associated with said housing at opposite ends thereof for supporting a work piece, a carriage including an elevated head mounted for endwise movement on said housing, and a welding torch assembly and associated fluxing system mounted on said carriage for movement therewith relative to a work piece supported on said housing, the improvement comprising said welding torch assembly including a welding tip, weld wire conduit means for supplying weld wire to said tip, and flux dispensing conduit means including a dispensing nozzle enclosing said welding tip;

a fluxing system associated with said carriage; said fluxing system comprising a flux hopper mounted in said carriage head; supply conduit means connecting said flux hopper and said torch assembly body;

a flux collection tray mounted on said carriage underlying said torch assembly; a closed flux box underlying said flux tray; collection conduit means between said flux tray and said flux box, and associated valve means for selectively opening and closing said collection conduit means; said flux box having a bottom discharge sump;

return conduit means connecting said discharge sump with said flux hopper; and pneumatic means for effecting the flow of flux from said discharge sump through said return conduit means to said flux hopper.

3. Automatic welding apparatus as set forth in claim 2 including a pneumatic actuator for said collection conduit valve means; conduit means for supplying pressurized air to said flux box; and control valve means for applying compressed air simultaneously to said discharge sump, to said pneumatic valve actuator to close said collection conduit means between said flux tray and said flux box, and to said flux box.

* * * * *

UNITED STATES PATENT AND TRADEMARK OFFICE
CERTIFICATE OF CORRECTION

PATENT NO. : 4,570,047
DATED : February 11, 1986
INVENTOR(S) : John Vislosky

It is certified that error appears in the above-identified patent and that said Letters Patent are hereby corrected as shown below:

Column 1, after line 54, insert the following paragraph:

--A fluxing system associated with the carriage includes the following components. A flux hopper is mounted in the carriage head, and supply conduit means communicates the flux hopper with the welding torch assembly. A flux collection tray is mounted on the carriage underlying that torch assembly; and a closed flux box underlies that flux collection tray. Collection conduit means between the flux tray and the flux box includes valve means for selectively opening and closing that collection conduit means. The flux box has a bottom discharge sump. A return conduit means connects that discharge sump with the flux hopper; and pneumatic means effects the flow of flux from that discharge sump through the return conduit means to the flux hopper.--

Signed and Sealed this

Third Day of June 1986

[SEAL]

Attest:

DONALD J. QUIGG

Attesting Officer

Commissioner of Patents and Trademarks